United States Patent [19]

Miceli

[11] Patent Number: 5,067,677
[45] Date of Patent: Nov. 26, 1991

[54] WIRE HARNESS

[76] Inventor: Edward Miceli, 595 Lake Pochung Rd., Sussex, N.J. 07461

[21] Appl. No.: 627,248

[22] Filed: Dec. 14, 1990

[51] Int. Cl.⁵ ............................................. F16L 3/22
[52] U.S. Cl. .................................... 248/68.1; 24/453; 248/742
[58] Field of Search ................... 248/68.1, 67.7, 69, 248/65, 73, 74.2, 49; 211/89, 60.1; 29/453, 525

[56] References Cited

U.S. PATENT DOCUMENTS

| | | | |
|---|---|---|---|
| 799,092 | 9/1905 | Rosenfeld | 248/73 X |
| 3,090,826 | 5/1963 | Cochran | |
| 3,363,864 | 1/1968 | Olgreen | 248/74.2 X |
| 3,861,015 | 1/1975 | Hodven | 248/74.2 X |
| 4,126,012 | 11/1978 | Waller | 248/49 X |
| 4,141,524 | 2/1979 | Corvese, Jr. | 248/74.2 X |
| 4,560,126 | 12/1985 | Judkins et al. | 248/73 X |
| 4,566,660 | 1/1986 | Anscher et al. | 248/74.2 |
| 4,623,102 | 11/1986 | Hough, Jr. | 248/68.1 |
| 4,709,888 | 12/1987 | Cubit et al. | 248/68.1 X |
| 4,795,856 | 1/1989 | Farmer | 248/68.1 X |
| 4,905,942 | 3/1990 | Moretti | 248/68.1 |
| 4,936,530 | 6/1990 | Wollar | 248/68.1 X |
| 4,960,253 | 10/1990 | Perrault et al. | 248/68.1 |

Primary Examiner—Ramon O. Ramirez
Attorney, Agent, or Firm—Thomas L. Adams

[57] ABSTRACT

A wire harness mounted on the face of a stud can support wires between two external surfaces of a wall. The harness has a plurality of wire clips on an L-shaped bracket. The bracket has two perpendicular arms. The plurality of wire clips is mounted on one of the arms, the other one having a mounting device. This mounting device can secure the bracket to the face of the stud. The mounting device is arranged to align the clips in a row that lies in a plane perpendicular to the face of the stud at a central location between the external surfaces of the wall.

19 Claims, 2 Drawing Sheets

WIRE HARNESS

BACKGROUND OF THE INVENTION

The present invention relates to wire harnesses, and in particular, to harnesses for supporting wires from a stud within a wall.

Building wiring is normally routed among the studs in walls. In the past such wiring has been secured close to the studs by stapling or otherwise. When many wires are secured to a stud they often come very close to the exterior of the wall. Safety considerations require keeping the wires within the wall at a minimum distance from the plasterboard or other exterior surface finishing the wall. Such minimum spacing has been incorporated into the building code of some jurisdictions. If too close to the exterior, wires may be pierced by nails or other fasteners driven into the wall. Such interception may either short the wire or place the nail head at a dangerously high potential. This dangerous condition may not be detected before a worker or home owner is injured. Alternatively, a nail piercing the sheath of a wire may not cause immediate damage until later when vibration precipitates the short. Such short can cause a dangerous overload or fire.

Numerous brackets and harnesses exist for supporting wires. Well known wire harnesses can hold the high voltage lines for automobile ignitions. Similarly, other known brackets can support wires in electronic equipment. None of these known wire harnesses, however, are arranged to support building wiring in a position which avoids damage by nails.

Known U-shaped brackets (for example U.S. Pat. No. 3,363,864) are designed to hold wires to as stud. These brackets, however, are not designed to orient the wires so that they are held centrally between the external surfaces of a wall. Thus, this known bracket will not avoid the nailing damage described above.

Also, known wire clips include barbs that allow wires to be pushed easily into the clip. The inwardly directed barbs prevents inadvertent removal of the wire. See also U.S. Pat. Nos. 3,090,826; 3,861,015; 4,141,524; 4,566,660; and 4,905,942.

Accordingly, there is a need for a simple and effective bracket for holding wires in a central location in stud constructed walls to prevent nail damage.

SUMMARY OF THE INVENTION

In accordance with the illustrative embodiments demonstrating features and advantages of the present invention, there is provided a wire harness for supporting wires from the face of a stud between two external surfaces of a wall. The wire harness has a plurality of wire clips and an L-shaped bracket. The L-shaped bracket has two perpendicular arms. The plurality of wire clips is mounted on one of the arms, the other one of the arms having a mounting means. The mounting means can secure the bracket to the face of the stud. This mounting is arranged to align the clips in a row that lies in a plane perpendicular to the face of the stud at a central location between the external surfaces of the wall.

In a related method of the same invention, wires can be installed on a face of a stud between two external surfaces of a wall, by employing an L-shaped bracket having one arm supporting a plurality of wire clips. The method includes the step of positioning the bracket, with the clips in a row that lies in a plane perpendicular to the face of the stud at a central location between the external surfaces of the wall. Another step is securing the bracket to the face of the stud by the mounting means. Another step in the method is clipping at least one of the wires into one of the clips.

In a preferred embodiment, the L-shaped bracket has a longer arm that supports, for example, five wire clips. In this preferred embodiment, the wire clips are a series of pairs of parallel barriers with opposing, inwardly directed tabs that grasp the wire. Preferably, one of the barriers has a hingedly connected clasp with a clasp barb that clips to a corresponding barb on the opposing barrier. Thus, the wire is held tightly by the barrier tabs and positively retained by a clasp.

In this preferred embodiment, the shorter arm of the bracket has a special length. If the installer nails the shorter with its end aligned with an outer vertical edge of the stud, the longer arm containing the clips is automatically centered between the external surfaces of the wall. For example, the wire clips will lie in a one inch zone centered between the exterior surfaces. In this way, normal nails piercing the finished wall are unable to reach the centrally located wires and damage them.

BRIEF DESCRIPTION OF THE DRAWINGS

The above brief description as well as other objects, features and advantages of the present invention will be more fully appreciated by reference to the following detailed description of presently preferred, but nonetheless illustrative embodiments in accordance with the present invention when taken in conjunction with the accompanying drawings, wherein.

BRIEF DESCRIPTION OF THE PREFERRED EMBODIMENTS

Figure 1:
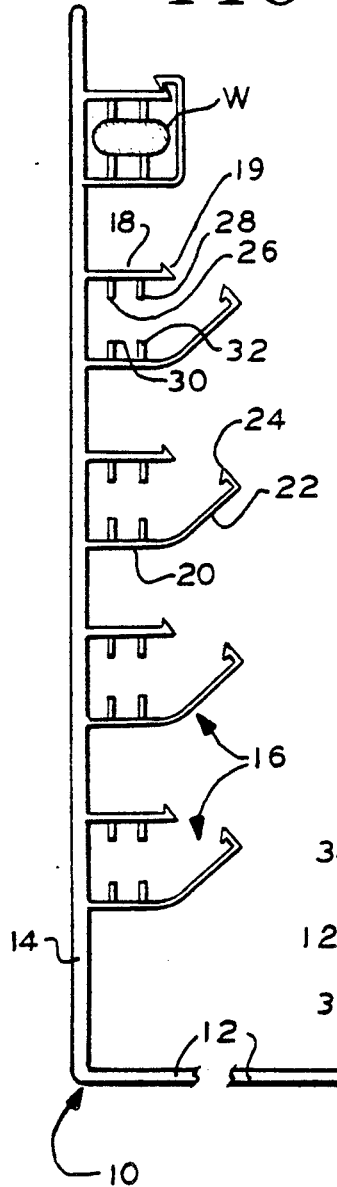
FIG. 1 is a top view of a wire harness in accordance with principles of the present invention.

FIG. 1 shows L-shaped bracket 10 with a short arm 12 and a longer arm 14. In this view, the overall dimensions of bracket 10 are 6.375 inches by 2.100 inches. In other embodiments these dimensions can vary depending upon the number of wires to be held and the size of the stud on which the bracket is to be mounted. The thickness of each of the arms 12 and 14 is preferably 0.100 inch.

In this embodiment, four identical wire clips 16, arranged in a row, each employ a spaced pair of parallel barriers 18 and 20, each 0.500 inch high. Clasp 22 extends from and is hingedly connected to barrier 20. Barriers 18 and 20 and clasp 22 are plate-like members that are 2.5 inches wide and 0.035 inch thick and spaced apart 0.500 inch. It will be appreciated that the foregoing dimensions can be altered depending upon the wire and stud size, and the desired bracket strength, weight etc. The clasp 22 ends in a clasp barb 24 in the shape of a right angle bend terminating in a reverse point.

In the opening between barriers 18 and 20, are four tabs as follows: inner tab 26 and outer tab 28 are mounted on the inside of barrier 18; and inner tab 30 and outer tab 32 are mounted on the inside of barrier 20.

Tabs 26–32 are rectangular and parallel to arm 14. As illustrated by wire W, tabs 26–32 are arranged to bear against the outside of wire W and hold it centered in the opening between barriers 18 and 20.

Figure 2:
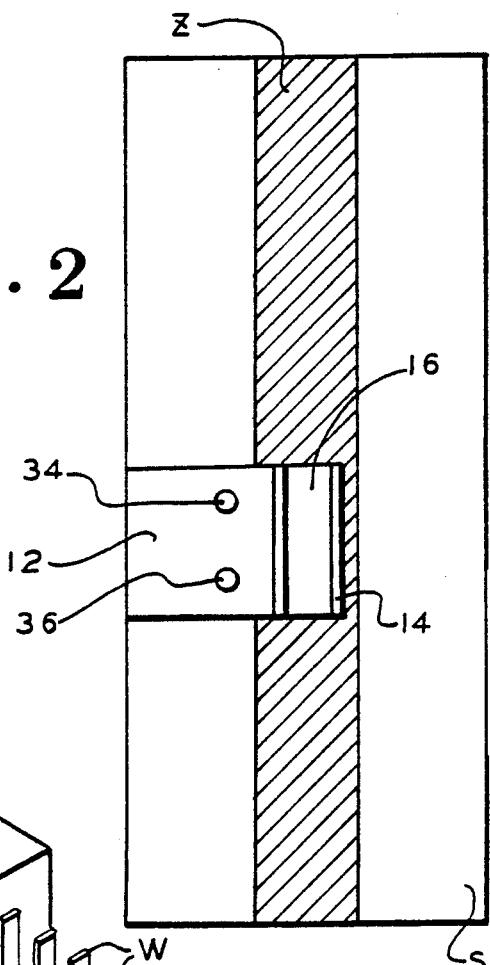
FIG. 2 is an end view of the harness of FIG. 1 installed on a stud between two external wall surfaces.

FIG. 2 shows the wider face of a "two by four" stud S (actually 1½"×3 ½"). The outer edge of shorter bracket arm 12 is coterminous with the outer edge of the illustrated face of stud S. A mounting means is shown herein as nail holes 34 and 36, although screws or other fasteners can be inserted through holes 34 and 36. Alternatively, the material of arm 12 can be selected to allow stapling directly through the arm.

Significantly, the length of arm 12 is chosen to center wire clips 16 between the edges of the face of stud S. Indeed, the applicable building code may require clearance from the right and left edge of stud S of 1.25 inches. This clearance leaves a one inch vertical safety zone Z for the wiring. The wire clip 16 is centered in zone Z.

Figure 3:
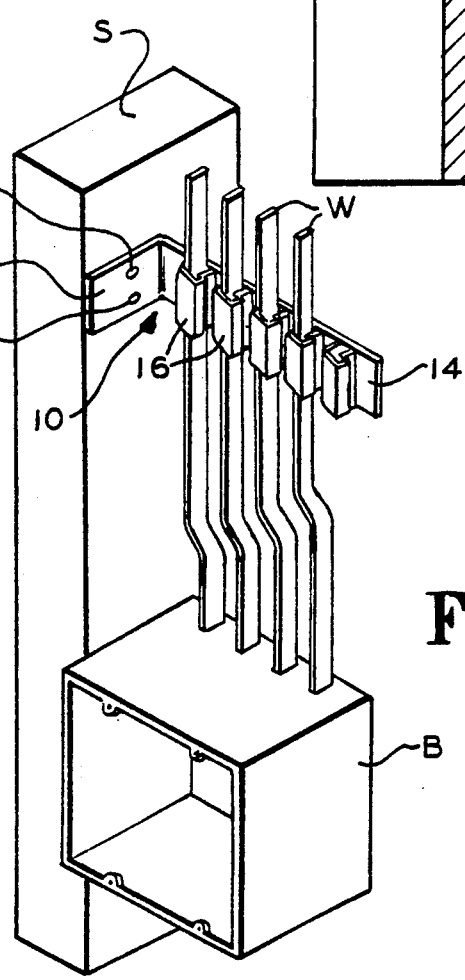
FIG. 3 is a perspective view of the harness of FIGS. 1 and 2 also showing the stud, a plurality of installed wires and an electrical box.

FIG. 3 shows vertical stud S with bracket 10 nailed to its wider face. Shorter arm 12 has its outer end coterminous a vertical edge of stud S. As noted before, clips 16 are then automatically centered along a central plane perpendicular to the supporting face of stud S. The wires W are shown fastened into clips 16 and routed to a conventional electrical box B. Box B can be a junction box for various purposes such as holding outlets, switches etc.

Box B can be installed before or after the installation of bracket 10. Bracket 10 can be installed by positioning the outer end of arm 12 coterminous with the edge of stud S. Nails can then be hammered through holes 34, 36, thus positioning bracket 10 and centering clip 16. Then, wires W can be inserted between barriers 18 and 20 (FIG. 1) while clasp 22 is open. Thereafter, clasp 22 can be closed by bringing clasp barb 24 over barrier barb 19. This locks the clasp and keeps wire W positioned as shown in FIG. 1 between the tabs 26–32. Additional brackets can be nailed to the stud as often as needed or as required by applicable building codes.

Figure 4:
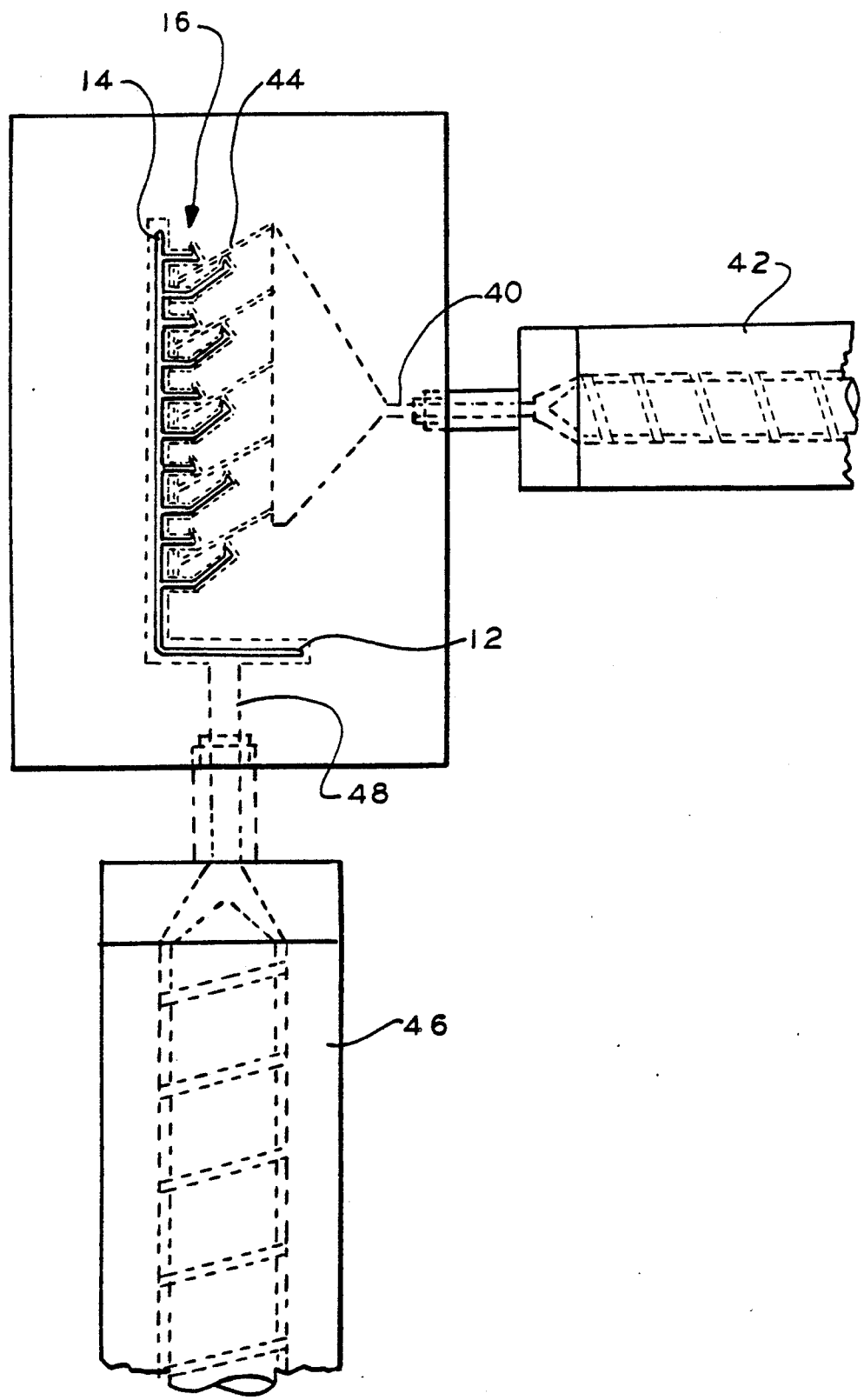
FIG. 4 is schematic diagram showing a mold and molding process for making the harness of FIG. 1.

FIG. 4 shows mold 38 with an inlet 40, which is attached to a conventional extruder for injecting plastic material at, for example, 340° F. at a pressure of about 1,100 to 3,500 psi. Channel 40 leads to a manifold having individual channels 44 that feed the cavity that makes the bracket clips 16.

Another conventional extruder 46 operating in a similar fashion, delivers plastic material through channel 48 which feeds the cavity for making arms 12 and 14 of the bracket. In this embodiment, the plastic material from extruder 42 is different from that injected by extruder 46. Preferably, the plastic material from extruder 46 is rigid, while a more flexible material is delivered by extruder 42. The more flexible material allows the wire clips 16 give so that the tabs and clasp associated with bracket 16 can flex and properly holding wires.

As an example, the flexible plastic from extruder 42 may be Dexter type PVC661/3-90 (Newark, New Jersey), a flexible vinyl compound designed for exterior extrusion. Preferably, the plastic flexible material should have good abrasion resistance and adhesion properties, ultraviolet inhibitors, and extraction resistance to water and detergents. The preferred flexible plastic has a tensile strength of 2,800 psi, a 100% modulus of 2,000 psi and a brittle temperature of −38° C.

The more rigid plastic material from extruder 46 can be a vinyl such as Geon type 8714 (Cleveland, Ohio). Preferably, its tensile strength is 6,100 psi at 73° F. The percentage elongation (yield) is 2.9 and the flexural strength is preferably 11,500 psi with the modulus of elasticity (tension) at 340,000 psi. The deflection temperature at 264 psi is 161° F. Preferably, all plastics are self extinguishing.

It is to be appreciated that various modifications may be implemented with respect to the above described preferred embodiments. For example, various dimensions of the arms of the bracket can be altered depending upon the size of the studs and the number of wires to be supported. Furthermore, the wire clips can be of various types and the clasp may be eliminated in some embodiments. Also the dimension of the wire clips can be altered depending upon the expected size of the wires. Also, the number of wire clips can vary depending upon the application. While composite plastic materials are described, in some embodiments the molding may be a single homogeneous type of plastic. Alternatively, the bracket with clips can be formed of other materials such as metals, ceramic etc.

Obviously many modifications and variations of the present invention are possible in light of the above teachings. It is therefore to be understood that within the scope of the appended claims, the invention may be practiced otherwise than as specifically described.

I claim:

1. A wire harness for supporting wires from a face of a stud between two external surfaces of a wall, comprising:
   a plurality of wire clips having a plurality of barriers spaced for embracing therebetween one or more of said wires; and
   an L-shaped bracket having two perpendicular arms, said plurality of wire clips being mounted on one of said arm, the other one of said arms having
   mounting means for securing said bracket to the face of said stud, said mounting means being arranged to align said clips in a row that lies in a plane perpendicular to the face of said stud at a central location between said external surfaces of said wall, said mounting means being arranged to set said row perpendicular to the face of said stud, said plurality of clips each having an opening axis aligned to support each of the wires in a direction that is mutually orthogonal to the length of said arms of said bracket.

2. A wire harness according to claim 1 wherein said harness is made of plastic.

3. A wire harness according to claim 2 wherein said harness is an integral plastic molding, said arms being made of a more rigid plastic than said barriers.

4. A wire harness according to claim 1 wherein each of said clips has a clasp extending from one of said barriers for releasably closing on the other one of said barriers, said clasp being operable to retain one of the wires between said barriers.

5. A wire harness according to claim 4 wherein an adjacent pair of barriers each have at least one opposing tab for gripping one of said wires.

6. A wire harness according to claim 5 further comprising:
   a clasp barb at the end of said clasp; and
   a barrier barb at the top of that one of said barriers that said clasp closes upon.

7. A wire harness according to claim 4 wherein an adjacent pair of barriers each has at least two opposing tabs for gripping one of said wires.

8. A wire harness according to claim 1 wherein said wire clips are mounted on one of said arms on the side proximate to the other one of said arms.

9. A wire harness according to claim 1 wherein said mounting means comprises at least one hole.

10. A wire harness according to claim 1 wherein said mounting means comprises at least two nail holes.

11. A wire harness according to claim 1 wherein that one of said arms having said mounting means is less than 2¼ inches in length.

12. A wire harness according to claim 11 wherein that one of said arms having said mounting means is at least 1½ inches in length.

13. A wire harness according to claim 1 wherein that one of said arms having said mounting means, if positioned coterminous with an edge of said stud adjacent one of said external surfaces, is sized to bring said wires at least 1¼ inches from both edges of said stud adjacent said external surfaces.

14. A method for installing wires on a face of a stud between two external surfaces of a wall with an L-shaped bracket having one arm supporting a plurality of wire clips, comprising the steps of:

positioning said bracket with said clips in a row that lies in a plane perpendicular to the face of said stud at a central location between said external surfaces of said wall;

affixing said bracket to the face of said stud by fastening a mounting means through said bracket into said stud, to keep both said row of clips and said wires in said clips (a) in said plane that is perpendicular to the face of said stud and (b) at said central location between said external surfaces of said wall; and clipping at least one of said wires into one of said clips.

15. A method according to claim 14 wherein the step of clipping at least one of said wires is performed to orient that wire parallel to the length of said stud, the step of positioning said bracket is performed to make said row perpendicular to the face of said stud.

16. A method according to claim 15 wherein the step of clipping at least one of said wires is performed to clip a plurality of wires separately into corresponding ones of said clips with the wires oriented parallel to the length of said stud.

17. A method according to claim 15 wherein the row of said clips is centered between said external surfaces of said wall.

18. A method according to claim 15 wherein the row of said clips is spaced a minimum of about 1¼ inches from the edges of the face of said stud adjacent to said external surfaces.

19. A method according to claim 18 wherein the row of said clips is centered between said external surfaces of said wall.

* * * * *